United States Patent
Wang et al.

(10) Patent No.: US 9,296,894 B2
(45) Date of Patent: Mar. 29, 2016

(54) REINFORCED POLYESTERCARBONATE, POLYCARBONATE-POLYDIORGANOSILOXANE, POLY(BUTYLENE-TEREPHTHALATE) BLEND, AND ARTICLE COMPRISING SAME

(71) Applicant: SABIC Global Technologies B.V., Bergen op Zoom (NL)

(72) Inventors: Liang Wang, Shanghai (CN); Hongtao Shi, Shanghai (CN); Dake Shen, Shanghai (CN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/359,938

(22) PCT Filed: Mar. 13, 2013

(86) PCT No.: PCT/CN2013/072551
§ 371 (c)(1),
(2) Date: May 22, 2014

(87) PCT Pub. No.: WO2014/139110
PCT Pub. Date: Sep. 18, 2014

(65) Prior Publication Data
US 2015/0368464 A1    Dec. 24, 2015

(51) Int. Cl.
| | |
|---|---|
| *C08G 18/42* | (2006.01) |
| *C08L 69/00* | (2006.01) |
| *C08G 63/64* | (2006.01) |
| *C08L 67/02* | (2006.01) |
| *C08L 83/10* | (2006.01) |
| *C08L 51/00* | (2006.01) |
| *C08G 77/448* | (2006.01) |

(52) U.S. Cl.
CPC ............... *C08L 69/005* (2013.01); *C08G 63/64* (2013.01); *C08L 67/02* (2013.01); *C08L 69/00* (2013.01); *C08L 83/10* (2013.01); *C08G 77/448* (2013.01); *C08L 2201/02* (2013.01); *C08L 2205/02* (2013.01); *C08L 2205/03* (2013.01); *C08L 2207/04* (2013.01)

(58) Field of Classification Search
CPC .............................. C08L 67/02; C09D 167/00
USPC ......................................................... 524/539
See application file for complete search history.

(56) References Cited

U.S. PATENT DOCUMENTS

| | | |
|---|---|---|
| 3,419,634 A | 12/1968 | Vaughn |
| 3,419,635 A | 12/1968 | Vaughn |
| 3,821,325 A | 6/1974 | Merritt et al. |
| 3,832,419 A | 8/1974 | Merritt, Jr. |
| 5,025,081 A | 6/1991 | Fontana et al. |
| 5,321,114 A | 6/1994 | Fontana et al. |
| 6,072,011 A | 6/2000 | Hoover |
| 6,307,005 B1 | 10/2001 | Davis et al. |
| 7,510,768 B2 | 3/2009 | Crawford et al. |
| 7,632,881 B2 | 12/2009 | Chen et al. |
| 7,848,025 B2 | 12/2010 | Hatano et al. |
| 8,064,140 B2 | 11/2011 | Hoeks et al. |
| 8,084,134 B2 | 12/2011 | Malinoski et al. |
| 2006/0046043 A1 | 3/2006 | Tani |
| 2006/0286384 A1 | 12/2006 | Crawford et al. |
| 2008/0103235 A1 | 5/2008 | Hale |
| 2010/0129649 A1 | 5/2010 | Malinoski et al. |
| 2010/0168370 A1 | 7/2010 | Hatano et al. |
| 2011/0071261 A1 | 3/2011 | Hoeks et al. |
| 2011/0129801 A1 | 6/2011 | Barman |
| 2012/0184661 A1 | 7/2012 | Van der mee et al. |
| 2012/0184662 A1 | 7/2012 | Van Der Mee et al. |

FOREIGN PATENT DOCUMENTS

| | | |
|---|---|---|
| EP | 0524731 A1 | 1/1993 |
| JP | 4665614 B2 | 1/2011 |
| JP | 2011094136 A | 5/2011 |
| WO | 9817725 A1 | 4/1998 |
| WO | 2009042755 A1 | 4/2009 |
| WO | 2010078412 A1 | 7/2010 |
| WO | 2012058821 A1 | 5/2012 |
| WO | 2012095822 A1 | 7/2012 |

OTHER PUBLICATIONS

International Search Report and Written Opinion dated Dec. 19, 2013; International Application No. PCT/CN2013/072551; International Filing Date Mar. 13, 2013; 12 pages.
Sabic Innovative Plastics, "Lexan* EXL resin", 24 pages (2008).

*Primary Examiner* — Terressa Boykin
(74) *Attorney, Agent, or Firm* — Cantor Colburn LLP

(57) ABSTRACT

A composition includes specific amounts of a poly(butylene terephthalate), a reinforcing filler, and a polycarbonate that includes a copolyestercarbonate and a polycarbonate-polydiorganosiloxane block copolymer. The copolyestercarbonate includes aliphatic ester groups. The composition, which exhibits a desirable balance of melt flow and ductility, is especially useful for forming thin plastic parts of consumer electronic devices, including mobile phones.

20 Claims, 1 Drawing Sheet

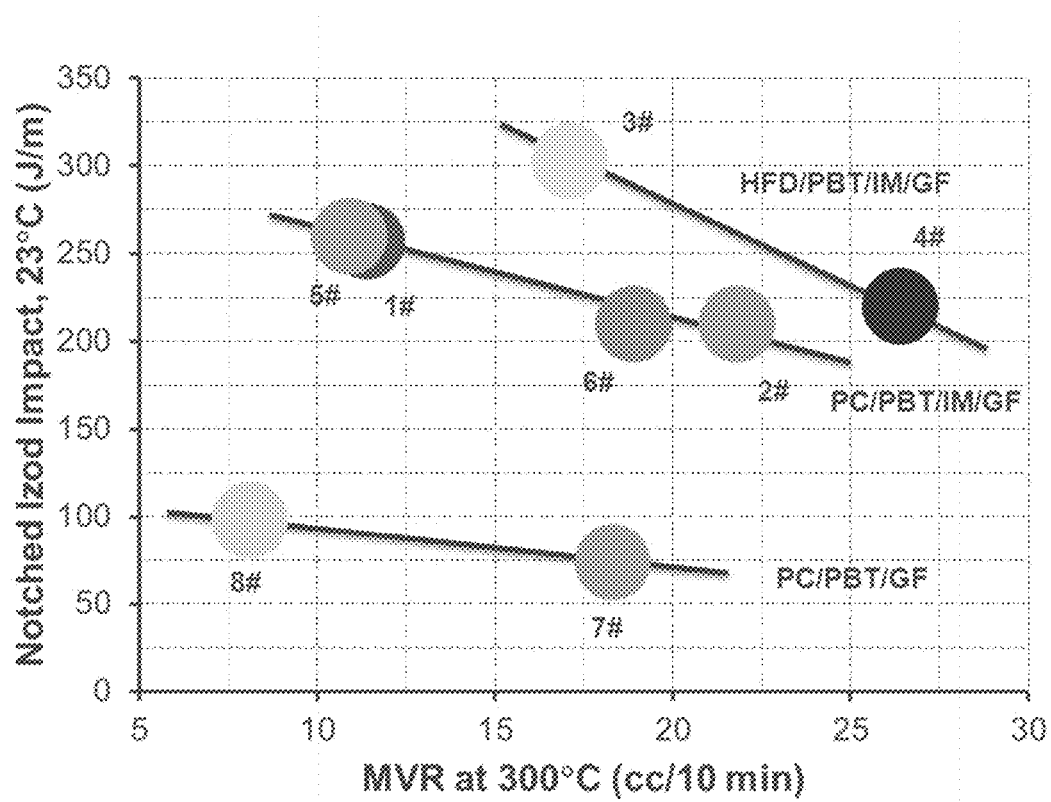

REINFORCED POLYESTERCARBONATE, POLYCARBONATE-POLYDIORGANOSILOXANE, POLY(BUTYLENE-TEREPHTHALATE) BLEND, AND ARTICLE COMPRISING SAME

BACKGROUND OF THE INVENTION

Polycarbonates are amorphous polymers valued for their optical properties, thermal resistance, toughness, and impact resistance. Copolyestercarbonates, having both ester and carbonate repeat units, are known to have polycarbonate-like properties together with substantially increased melt flow at the same molecular weight compared to an ordinary aromatic polycarbonate.

The trend in consumer electronics is to make entire devices lighter and thinner. New device designs provide new challenges to plastic composites as the designs require a plastic composite with an improved balance of melt flow and impact strength while substantially maintaining tensile strength and heat resistance. This property combination has been difficult to achieve with polycarbonate composites, due in part to the high melt viscosity of polycarbonate. Moreover, some applications including in-mold decoration/labeling (IMD/IML) require low processing temperatures to avoid ink wash-out, and high melt flow to fill a mold and adhere to a membrane within the mold. Polycarbonate composites need high process temperature to reach the flow requirement, but such temperatures cause ink wash-out problems.

There is a need for thermoplastic compositions having an improved balance of impact strength and melt flow while substantially retaining tensile properties and heat resistance.

BRIEF SUMMARY OF EMBODIMENTS OF THE INVENTION

One embodiment is a composition, comprising: 45 to 85 weight percent of a polycarbonate comprising
35 to 75 weight percent of a copolyestercarbonate comprising
ester units of the formula

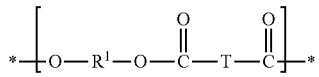

wherein, independently in each ester unit, $R^1$ is an unsubstituted or substituted divalent $C_{6-30}$ aromatic group; and T is an unsubstituted or substituted $C_4$-$C_{18}$ aliphatic divalent group; and carbonate units of the formula

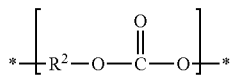

wherein, independently in each carbonate unit, $R^2$ is a radical of the formula

wherein each of $A^1$ and $A^2$ is independently a monocyclic divalent aryl radical and $Y^1$ is a bridging radical having one or two atoms that separate $A^1$ from $A^2$; and
10 to 30 weight percent of a polycarbonate-polydiorganosiloxane block copolymer;
10 to 30 weight percent of poly(butylene terephthalate); and
5 to 20 weight percent reinforcing filler; wherein all weight percents are based on the total weight of the composition.

Another embodiment is an article comprising a composition comprising: 45 to 85 weight percent of a polycarbonate comprising
35 to 75 weight percent of a copolyestercarbonate comprising
ester units of the formula

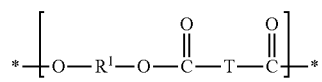

wherein, independently in each ester unit, $R^1$ is an unsubstituted or substituted divalent $C_{6-30}$ aromatic group; and T is an unsubstituted or substituted $C_4$-$C_{18}$ aliphatic divalent group; and
carbonate units of the formula

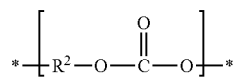

wherein, independently in each carbonate unit, $R^2$ is a radical of the formula

wherein each of $A^1$ and $A^2$ is independently a monocyclic divalent aryl radical and $Y^1$ is a bridging radical having one or two atoms that separate $A^1$ from $A^2$; and
10 to 30 weight percent of a polycarbonate-polydiorganosiloxane block copolymer;
10 to 30 weight percent of poly(butylene terephthalate); and
5 to 20 weight percent reinforcing filler; wherein all weight percents are based on the total weight of the composition.

These and other embodiments are described in detail below.

BRIEF DESCRIPTION OF THE DRAWING

The FIGURE is a plot of notched Izod impact strength, expressed in units of joules/meter and determined at 23° C. according to ASTM D256, versus melt volume flow rate at 300° C., expressed in cubic centimeters/10 minutes and determined at 300° C. and 1.2 kilogram load according to ASTM D1238.

DETAILED DESCRIPTION OF THE INVENTION

The present inventors have determined that an improved balance of impact strength and melt flow is provided by a composition that includes specific amounts of a copolyestercarbonate, a polycarbonate-polydiorganosiloxane block copolymer, a poly(butylene terephthalate), and a reinforcing filler. The improved balance of impact strength and melt flow is achieved while substantially retaining tensile properties and heat resistance. For example, in some embodiments the composition exhibits a melt volume flow rate of at least 15 centimeter$^3$/10 minutes measured at 300° C. and 1.2 kilogram load according to ASTM D1238; a notched Izod impact strength of at least 200 joules/meter measured at 23° C. according to ASTM D256; a tensile stress at yield of at least 50 megapascals measured at 23° C. according to ASTM D638; and a Vicat softening temperature of at least 115° C.

measured at a load of 50 Newtons and a heating rate of 120° C./hour according to ASTM D1525. In some embodiments, the composition exhibits a melt volume flow rate of 15 to 45 centimeter$^3$/10 minutes measured at 300° C. and 1.2 kilogram load according to ASTM D1238; a notched Izod impact strength of 200 to 350 joules/meter measured at 23° C. according to ASTM D256; a tensile stress at yield of 50 to 60 megapascals measured at 23° C. according to ASTM D638; and a Vicat softening temperature of 115 to 125° C. measured at a load of 50 Newtons and a heating rate of 120° C./hour according to ASTM D1525.

One embodiment is a composition, comprising: 45 to 85 weight percent of a polycarbonate comprising 35 to 75 weight percent of a copolyestercarbonate comprising
ester units of the formula

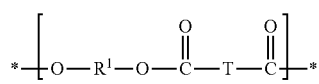

wherein, independently in each ester unit, $R^1$ is an unsubstituted or substituted divalent $C_6$-$C_{30}$ aromatic group; and T is an unsubstituted or substituted $C_4$-$C_{18}$ aliphatic divalent group; and
carbonate units of the formula

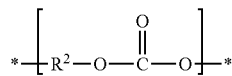

wherein, independently in each carbonate unit, $R^2$ is a radical of the formula

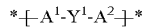

wherein each of $A^1$ and $A^2$ is independently a monocyclic divalent aryl radical and $Y^1$ is a bridging radical having one or two atoms that separate $A^1$ from $A^2$; and
10 to 30 weight percent of a polycarbonate-polydiorganosiloxane block copolymer;
10 to 30 weight percent of poly(butylene terephthalate); and
5 to 20 weight percent reinforcing filler; wherein all weight percents are based on the total weight of the composition.

The composition includes a copolyestercarbonate. A copolyestercarbonate is a specific type of polycarbonate. It is a copolymer comprising ester blocks and carbonate blocks.

Generally, as used herein, the terms "polycarbonate" and "polycarbonate resin" mean compositions having repeating structural carbonate units of the formula

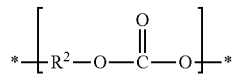

in which at least 60 percent of the total number of $R^2$ groups are aromatic organic radicals and the balance thereof are aliphatic, alicyclic, or aromatic radicals. In some embodiments of the polycarbonate, each $R^2$ is an aromatic organic radical, for example a radical of the formula

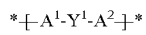

wherein each of $A^1$ and $A^2$ is independently a monocyclic divalent aryl radical and $Y^1$ is a bridging radical having one or two atoms that separate $A^1$ from $A^2$. In some embodiments, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a $C_1$-$C_{12}$ (divalent) hydrocarbylene group. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen. Examples of $Y^1$ include methylene (—CH$_2$—; also known as methylidene), ethylidene (—CH(CH$_3$)—), isopropylidene (—C(CH$_3$)$_2$—), and cyclohexylidene.

Polycarbonates can be produced by the reaction of a carbonate precursor with a dihydroxy compound having the formula HO—$R^2$—OH, which includes dihydroxy compounds of the formula

HO-$A^1$-$Y^1$-$A^2$-OH wherein $Y^1$, $A^1$ and $A^2$ are as described above. Also included among dihydroxy compounds are bisphenol compounds of the formula

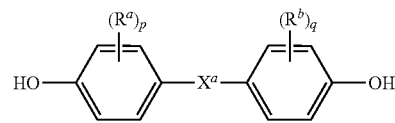

wherein $R^a$ and $R^b$ each independently represent a halogen atom or a $C_1$-$C_{12}$ hydrocarbyl group; p and q are each independently 0, 1, 2, 3, or 4; and $X^a$ represents one of the groups of formula

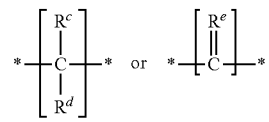

wherein $R^c$ and $R^d$ each independently represent a hydrogen atom or a (monovalent) hydrocarbyl group, and $R^e$ is a $C_1$-$C_{12}$ (divalent) hydrocarbylene group.

In some embodiments, a heteroatom-containing cyclic alkylidene group comprises at least one heteroatom with a valence of 2 or greater, and at least two carbon atoms. Heteroatoms for use in the heteroatom-containing cyclic alkylidene group include —O—, —S—, and —N(Z)—, where Z is a substituent group selected from hydrogen, hydroxyl, $C_1$-$C_{12}$ alkyl, $C_1$-$C_{12}$ alkoxyl, and $C_1$-$C_{12}$ acyl. The cyclic alkylidene group or heteroatom-containing cyclic alkylidene group can have 3 to 20 atoms, and it can be a single saturated or unsaturated ring, or a fused polycyclic ring system wherein the fused rings are saturated, unsaturated, or aromatic.

Other bisphenols containing substituted or unsubstituted cyclohexane units can be used, for example bisphenols of the formula

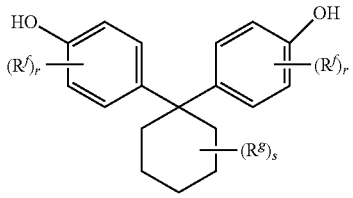

wherein each occurrence of r is independently 0, 1, 2, 3, or 4; s is 0, 1, 2, 3, 4, 5, 6, 7, 8, 9, or 10; each occurrence of $R^f$ is $C_1$-$C_{12}$ hydrocarbyl or halogen; and each occurrence of $R^g$ is independently $C_1$-$C_{12}$ hydrocarbyl. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, are supplied by Bayer under the APEC™ trade name.

Other useful dihydroxy compounds having the formula HO—$R^2$—OH include aromatic dihydroxy compounds of the formula

wherein n is 0, 1, 2, 3, or 4; each occurrence of $R^h$ is independently halogen, $C_1$-$C_{10}$ hydrocarbyl (such as a $C_1$-$C_{10}$ alkyl group), or halogen-substituted $C_1$-$C_{10}$ hydrocarbyl (such as a halogen-substituted $C_1$-$C_{10}$ alkyl group). In some embodiments, the halogen of the halogen-substituted $C_1$-$C_{10}$ hydrocarbyl is bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromohydroquinone, as well as combinations of at least two of the foregoing dihydroxy compounds.

Specific examples of bisphenol compounds include 1,1-bis(4-hydroxyphenyl)methane, 1,1-bis(4-hydroxyphenyl)ethane, 2,2-bis(4-hydroxyphenyl)propane ("bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations of at least two of the foregoing dihydroxy compounds can also be used.

When a polycarbonate other than the polyestercarbonate and the polycarbonate-polydiorganosiloxane block copolymer (that is, an additional polycarbonate) is included, the additional polycarbonate can be a linear homopolymer derived from bisphenol A, in which each of $A^1$ and $A^2$ is p-phenylene and $Y^1$ is isopropylidene. The additional polycarbonate generally can have an intrinsic viscosity, as determined in chloroform at 25° C., of 0.3 to 1.5 deciliters per gram (dl/g), specifically 0.45 to 1.0 dl/g. The additional polycarbonate can have a weight average molecular weight (Mw) of 10,000 to 100,000 atomic mass units, as measured by gel permeation chromatography (GPC) using a crosslinked styrene-divinyl benzene column, at a sample concentration of 1 milligram per milliliter, and as calibrated with polycarbonate standards.

The additional polycarbonate can be characterized by a melt volume flow rate (MVR), which is a measure of the rate of extrusion of molten resin through an orifice at a prescribed temperature and load. Additional polycarbonates useful for the formation of articles can have an MVR, measured at 300° C. under a load of 1.2 kilograms according to ASTM D1238-04 or ISO 1133, of 0.5 to 80 cubic centimeters per 10 minutes (cc/10 min). In some embodiments, the additional polycarbonate has an MVR measured at 300° C. under a load of 1.2 kilograms according to ASTM D1238-04 or ISO 1133, of 5 to 50 cc/10 min, specifically 5 to 45 cc/10 min. When present, the additional polycarbonate can be used in an amount of 1 to 20 weight percent, specifically 1 to 10 weight percent. In some embodiments the composition excludes additional polycarbonate.

"Polycarbonates" as used herein include homopolycarbonates, copolymers comprising different $R^2$ moieties in the carbonate (referred to herein as "copolycarbonates"), copolymers comprising carbonate units and other types of polymer units, such as ester units or polydiorganosiloxane units, and combinations of at least two of the foregoing. As used herein, "combination" is inclusive of blends, mixtures, alloys, and reaction products. In some embodiments, the polycarbonate component of the composition consists essentially of, or consists of, a copolyestercarbonate and a polycarbonate-polydiorganosiloxane block copolymer. In such embodiments polycarbonates other than the polyestercarbonate and the polycarbonate-polydiorganosiloxane block copolymer are present in a total amount of 0 to 5 weight percent, specifically 0 to 3 weight percent, more specifically 0 to 1 weight percent, based on the total weight of the composition. In some embodiments, polycarbonates other than the polyestercarbonate and the polycarbonate-polydiorganosiloxane block copolymer are excluded. In other embodiments, the polycarbonate component of the composition consists essentially of, or consists of, a copolyestercarbonate, a polycarbonate-polydiorganosiloxane block copolymer, and a bisphenol A polycarbonate.

As indicated above, a copolyestercarbonate is a specific type of polycarbonate polymer. In the present composition, such copolymers contain carbonate units of the formula

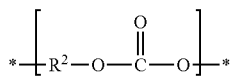

wherein $R^2$ is defined above, and, in addition, and ester units of the formula

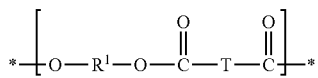

wherein $R^1$ is an unsubstituted or substituted divalent $C_6$-$C_{30}$ aromatic group; and T is an unsubstituted or substituted $C_4$-$C_{18}$ aliphatic divalent group. The $C_4$-$C_{18}$ aliphatic divalent group can be derived from a $C_6$-$C_{20}$ alpha,omega-aliphatic dicarboxylic acid. In some embodiments, T is a $C_4$-$C_{16}$ alkylene group, specifically a $C_6$-$C_{14}$ alkylene group, still more specifically a $C_7$-$C_{10}$ alkylene group. $R^1$ can be derived from any of the aromatic dihydroxy compounds described above in the context of $R^2$. In some embodiments, T is —$(CH_2)_8$—, and $R^1$ and $R^2$ are

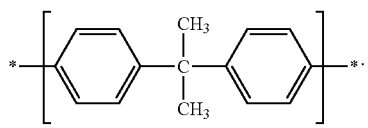

The unsubstituted or substituted $C_4$-$C_{18}$ aliphatic divalent group that is T can be straight chain, branched, cyclic, or a combination of branched and cyclic. In a specific embodiment, T is a straight chain alkylene group that is $C_4$-$C_{16}$, specifically $C_6$-$C_{14}$, more specifically $C_7$-$C_{10}$. In a very specific embodiment, T is —$(CH_2)_8$—, that is, T and its flanking carboxylate groups are the residue of sebacic acid.

The mole percent of ester units in the copolyestercarbonate can be, for example, 1 to 13 mole percent, specifically 4 to 10 mole percent, more specifically 6 to 9 mole percent, based on the total moles of carbonate and ester units.

In some embodiments, the copolyestercarbonate is a copolymer of soft block ester units with carbonate units that can be represented by the formula

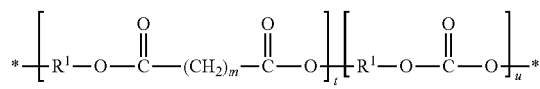

where each occurrence of $R^1$ is independently derived from a dihydroxyaromatic compound of the formula

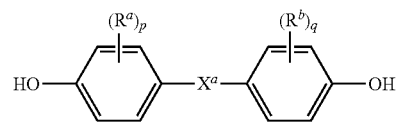

wherein $R^a$, $R^b$, $X^1$, p, and q are defined above, or the formula

wherein $R^h$ and n are defined above; m is 4 to 16; and t and u are average mole percentages of the ester and carbonate units, respectively, where t+u is 100 and, therefore, u is 100%−t %, wherein t % is the mole percent of the ester units as specified above for the copolyestercarbonate, and t is 1 to 13, specifically 4 to 10, more specifically 6 to 9.

Ester units, as defined herein, can be derived from an aliphatic alpha,omega-dicarboxylic acid or a reactive derivative thereof, such as an acid halide (specifically, the acid chloride), an ester, or the like. Exemplary alpha,omega-dicarboxylic acids (from which the corresponding acid chlorides can be derived) include $C_6$ alpha,omega-dicarboxylic acids such as hexanedioic acid (adipic acid); $C_{10}$ alpha,omega-dicarboxylic acids such as decanedioic acid (sebacic acid); and $C_{12}$ alpha,omega-dicarboxylic acids such as dodecanedioic acid (sometimes abbreviated as DDDA). In some embodiments, the copolyestercarbonate is represented by the formula

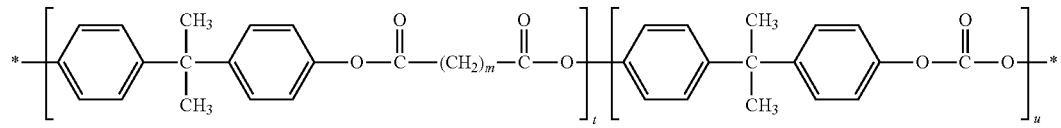

wherein m is 4 to 16; and t and u are average mole percentages of the ester and carbonate units, respectively, where t+u is 100 and t is 1 to 13, specifically 4 to 10, more specifically 6 to 9. In a very specific embodiment, m is 8, and the average mole ratio of t to u is 5:95 to 9:91.

Polycarbonates, either as the optional polycarbonate or as polycarbonate units within the copolyestercarbonate or the polycarbonate-polydiorganosiloxane block copolymer, can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, for example pH 8 to 10. Commonly used water immiscible solvents include methylene chloride, 1,2-dichloroethane, chlorobenzene, and toluene.

Carbonate precursors suitable for use in interfacial polymerization include, for example, carbonyl halides such as carbonyl bromide and carbonyl chloride (also known as phosgene), haloformates such as bishaloformates of dihydric phenols, and combinations of at least two of the foregoing. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X^-$, wherein each occurrence of $R^3$ is independently a $C_1$-$C_{10}$ alkyl group; Q is a nitrogen or phosphorus atom; and $X^-$ is a halide, a $C_1$-$C_8$ alkoxide, or a $C_6$-$C_{18}$ aryloxide. Useful phase transfer catalysts include, for example, $[CH_3(CH_2)_3]_4N^+X^-$, $[CH_3(CH_2)_3]_4P^+X^-$, $[CH_3(CH_2)_5]_4N^+X^-$, $[CH_3(CH_2)_6]_4N^+X^-$, $[CH_3(CH_2)_4]_4N^+X^-$, $CH_3[CH_3(CH_2)_3]_3N^+X^-$, and $CH_3[CH_3(CH_2)_2]_3N^+X^-$, wherein $X^-$ is $Cl^-$, $Br^-$, a $C_1$-$C_8$ alkoxide, or a $C_6$-$C_{18}$ aryloxide. An effective amount of a phase transfer catalyst can be 0.1 to 10 weight percent, specifically 0.5 to 2 weight percent, based on the weight of bisphenol in the reaction mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris (p-hydroxyphenyl)ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethylbenzyl)phenol), 4-chloroformyl phthalic anhydride, trimesic acid, benzophenone tetracarboxylic acid, and combinations of at least two of the foregoing. The branching agents can be added at a level of, for example, 0.05 to 2.0 weight percent. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)benzotriazoles and their derivatives, and 2-(2-hydroxyaryl)-1,3,5-triazines and their derivatives.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations of at least two of the foregoing; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with 22 or fewer carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations of at least two of the foregoing.

As an alternative to interfacial polymerization, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a BANBURY™ mixer, twin-screw extruder, or other melt-blending apparatus to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl) carboxylate, and combination of at least two of the foregoing. In addition, transesterification catalysts for use can include phase transfer catalysts of formula $(R^3)_4Q^+X^-$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, and combinations of at least two of the foregoing.

The copolyestercarbonate can also be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. For example, it is possible to use acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

The polyesters, either the poly(butylene terephthalate) or the polyester block of the copolyestercarbonate, can be obtained by interfacial polymerization or melt-process condensation as described above, by solution phase condensation, or by transesterification polymerization wherein, for example, a dialkyl ester such as dimethyl terephthalate can be transesterified with butylene glycol using acid catalysis, to generate poly(butylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In some embodiments, the copolyestercarbonate copolymer has a number average molecular weight ($M_n$) of 10,000 to 100,000 atomic mass units, specifically 15,000 to 50,000 atomic mass units. In some embodiments, the copolyestercarbonate has a number average molecular weight of 10,000 to 30,000 atomic mass units, specifically 12,000 to 22,000 atomic mass units. In some embodiments, the copolyestercarbonate copolymer has a weight average molecular weight ($M_n$) of 20,000 to 100,000 atomic mass units, specifically 25,000 to 50,000 atomic mass units. Molecular weight determinations are performed using gel permeation chromatography (GPC), using a crosslinked styrene-divinylbenzene column and calibration with polycarbonate references. Samples are prepared at a concentration of about 1 milligram/milliliter, and are eluted at a flow rate of about 1.0 milliliter/minute. The copolyestercarbonate can, optionally, include a first copolyestercarbonate having a number average molecular weight of 21,500 to 100,000 atomic mass units, and a second copolyestercarbonate having a number average molecular weight of less than 21,500 atomic mass units, specifically 1500 to less than 21,000 atomic mass units, more specifically 10,000 to 20,000 atomic mass units. The copolyestercarbonate can, in general, have an MVR of 5 to 150 cc/10 min, specifically 7 to 125 cc/10 min, more specifically 9 to 110 cc/10 min, and still more specifically 10 to 100 cc/10 min, measured at 300° C. and a load of 1.2 kilograms according to ASTM D1238-04. Commercial copolyestercarbonates are marketed under the trade name LEXAN™ HFD, including for example, LEXAN™ HFD1014, HFD1034, HFD1212, HFD1232, HFD1413, HFD1433, HFD1711, HFD1731, HFD1810, HFD1830, HFD1910, HFD1930, available from SABIC Innovative Plastics. In embodiments in which the reinforcing filler comprises glass fibers, a glass-filled LEXAN™ HFD resin can be used, such as HFD4211, HFD4271, HFD4412, HFD4413, HFD4471, and HFD4472, available from SABIC Innovative Plastics.

The composition can comprise the copolyestercarbonate in an amount of 35 to 75 weight percent, based on the total weight of the composition. Within this range, the copolyestercarbonate amount can be 40 to 70 weight percent, specifically 40 to 60 weight percent.

In addition to the copolyestercarbonate, the polycarbonate comprises a polycarbonate-polydiorganosiloxane block copolymer. A polycarbonate-polydiorganosiloxane block copolymer is a polycarbonate copolymer comprising at least one polycarbonate block and at least one polydiorganosiloxane block. In some embodiments, the polycarbonate-polydiorganosiloxane block copolymer comprises multiple polycarbonate blocks and multiple polydiorganosiloxane blocks.

The polycarbonate-polydiorganosiloxane block copolymer can be transparent, translucent, or opaque, depending on its composition.

Polycarbonate-polydiorganosiloxane block copolymers and methods for their preparation are known and described, for example, in U.S. Pat. Nos. 3,419,634 and 3,419,635 to Vaughn, U.S. Pat. No. 3,821,325 to Merritt et al., U.S. Pat. No. 3,832,419 to Merritt, and U.S. Pat. No. 6,072,011 to Hoover. Polycarbonate-polydiorganosiloxane block copolymers are also commercially available as LEXAN™ EXL resins from SABIC Innovative Plastics.

In some embodiments, each of the at least one polydiorganosiloxane blocks of the copolymer comprises diorganosiloxane units of the formula

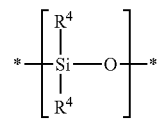

wherein each occurrence of $R^4$ is independently $C_{1-13}$ hydrocarbyl. Examples of suitable hydrocarbyl groups include $C_1$-$C_{13}$ alkyl (including alkyl groups that are linear, branched, cyclic, or a combination of at least two of the foregoing), $C_2$-$C_{13}$ alkenyl, $C_6$-$C_{12}$ aryl, $C_7$-$C_{13}$ arylalkyl, and $C_7$-$C_{13}$ alkylaryl. The foregoing hydrocarbyl groups can, optionally, be fully or partially halogenated with fluorine, chlorine, bromine, iodine, or a combination of at least two of the foregoing. In some embodiments, including embodiments in which a transparent polycarbonate-polydiorganosiloxane block copolymer is desired, $R^4$ is unsubstituted by halogen.

The polydiorganosiloxane blocks can each comprise 2 to 1,000 diorganosiloxane units. Within this range, the number of diorganosiloxane units can be 2 to 500, more specifically 5 to 100. In some embodiments, the number of diorganosiloxane repeat units in each block is 10 to 75, specifically 40 to 60.

In some embodiments, the polydiorganosiloxane block has the formula

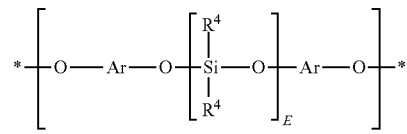

wherein $R^4$ is defined above; E is 2 to 1,000, specifically 2 to 500, more specifically 5 to 100, still more specifically 10 to 75, even more specifically 40 to 60; and each occurrence of Ar is independently an unsubstituted or substituted $C_6$-$C_{30}$ arylene group, wherein aromatic carbon atoms of the arylene group is directly bonded to each adjacent oxygen atom. Ar groups can be derived from a $C_6$-$C_{30}$ dihydroxyarylene compound, for example a dihydroxyarylene compound of formula

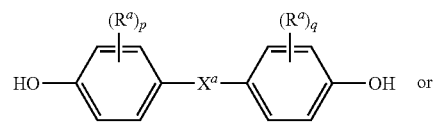

wherein $R^a$, $R^b$, $R^h$, $X^a$, p, and q are defined above. Examples of dihydroxyarylene compounds include hydroquinone, resorcinol, 1,1-bis(4-hydroxyphenyl)methane, 1,1-bis(4-hydroxyphenyl)ethane, 2,2-bis(4-hydroxyphenyl)propane (bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane.

In some embodiments, the polydiorganosiloxane block has the formula

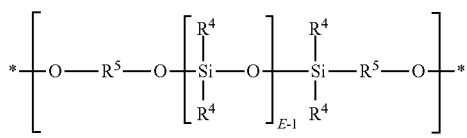

wherein $R^4$ and E are as defined above, and each occurrence of $R^5$ is independently (divalent) $C_1$-$C_{30}$ hydrocarbylene.

In a specific embodiment, the polydiorganosiloxane blocks have the formula

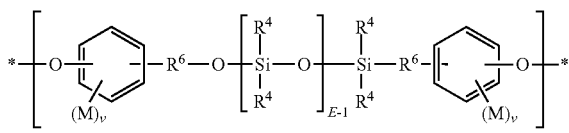

wherein $R^4$ and E are as defined above; each occurrence of $R^6$ is independently a divalent $C_2$-$C_8$ aliphatic group; each occurrence of M is independently halogen, cyano, nitro, $C_1$-$C_8$ alkyl, $C_1$-$C_8$ alkoxyl, $C_1$-$C_8$ alkylthio, $C_2$-$C_8$ alkenyl, $C_2$-$C_8$ alkenyloxyl group, $C_6$-$C_{10}$ aryl, $C_6$-$C_{10}$ aryloxyl, $C_7$-$C_{12}$ arylalkyl, $C_7$-$C_{12}$ arylalkoxyl, $C_7$-$C_{12}$ alkylaryl, or $C_7$-$C_{12}$ alkylaryloxyl; and each occurrence of v is independently 0, 1, 2, 3, or 4. In some embodiments, at least one occurrence of v is not zero, and each associated occurrence of M is independently chloro, bromo, $C_1$-$C_6$ alkyl (including methyl, ethyl, and n-propyl), $C_1$-$C_6$ alkoxyl (including methoxyl, ethoxyl, and propoxyl), or $C_6$-$C_{12}$ aryl or alkylaryl (including phenyl, chlorophenyl, and tolyl); each occurrence of $R^6$ is independently $C_2$-$C_4$ alkylene (including dimethylene, trimethylene, and tetramethylene); and $R^4$ is $C_1$-$C_8$ alkyl, $C_1$-$C_8$ haloalkyl (including 3,3,3-trifluoropropyl), $C_1$-$C_8$ cyanoalkyl, or $C_6$-$C_{12}$ aryl or alkylaryl (including phenyl, chlorophenyl, and tolyl). In some embodiments, each occurrence of $R^4$ is independently methyl, 3,3,3-trifluoropropyl, or phenyl. In some embodiments, all the occurrences of $R^4$ collective include at least one methyl and at least one 3,3,3-trifluoropropyl. In some embodiments, all the occurrences of $R^4$ collectively include at least one methyl and at least one phenyl. In some embodiments, each occurrence of v is 1, each occurrence of M is methoxyl, $R^6$ is a divalent $C_1$-$C_3$ alkylene group, and each occurrence of $R^4$ is methyl.

Blocks having the formula

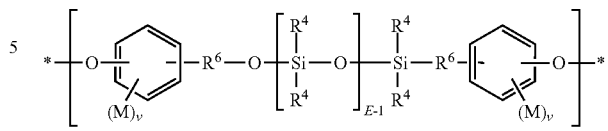

can be derived from the corresponding dihydroxy polydiorganosiloxane having the formula

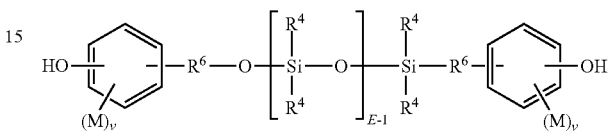

wherein E, v, $R^4$, $R^6$, and M are defined above. Such dihydroxy polydiorganosiloxanes can be prepared by a platinum-catalyzed reaction of an aliphatically unsaturated monohydric phenol with a diorganosiloxane hydride of the formula

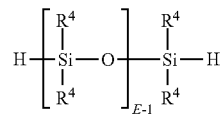

wherein E, and $R^4$ are defined above. Examples of aliphatically unsaturated monohydric phenols include 2-methoxy-4-allyl-phenol (eugenol), 2-allylphenol, 2-methyl-4-allylphenol, 2-allyl-4-methylphenol, 4-allyl-2-phenylphenol, 4-allyl-2-bromophenol, 4-allyl-2-t-butoxyphenol, 4-allyl-2-phenylphenol, 2-allyl-4-propylphenol, 2-allyl-4,6-dimethylphenol, 2-allyl-4-bromo-6-methylphenol, 2-allyl-6-methoxy-4-methylphenol, 2-allyl-4,6-dimethylphenol, and combinations of at least two of the foregoing.

The at least one polycarbonate block of the polycarbonate-polydiorganosiloxane block copolymer comprises carbonate units of the formula

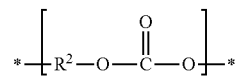

wherein $R^2$ is defined above.

In some embodiments, the polycarbonate-polydiorganosiloxane block copolymer comprises, based on the weight of the polycarbonate-polydiorganosiloxane block copolymer, 70 to 97 weight percent carbonate units and 3 to 30 weight percent of diorganosiloxane units. Within this range, the polycarbonate-polydiorganosiloxane block copolymer can comprise 70 to 90 weight percent, specifically 75 to 85 weight percent, of carbonate units, and 10 to 30 weight percent, specifically 15 to 25 weight percent of diorganosiloxane units.

In some embodiments, the polycarbonate-polydiorganosiloxane block copolymer has a weight average molecular weight of 2,000 to 100,000 atomic mass units, specifically 5,000 to 50,000 atomic mass units, as determined by gel permeation chromatography using a crosslinked styrene-divinyl benzene column, a sample concentration of 1 milligram per milliliter, and bisphenol A polycarbonate standards.

In some embodiments, the polycarbonate-polydiorganosiloxane block copolymer has a melt volume flow rate, measured at 300° C. and 1.2 kilogram load according to ASTM D1238-04, of 1 to 50 cubic centimeters per 10 minutes, specifically 2 to 30 cubic centimeters per 10 minutes, more specifically 3 to 20 cubic centimeters per 10 minutes. Mixtures of polycarbonate-polydiorganosiloxane block copolymers of different flow properties can be used to achieve desired flow properties for the composition as a whole.

In a very specific embodiment, the polycarbonate-polydiorganosiloxane block copolymer comprises, based on the weight of the polycarbonate-polydiorganosiloxane block copolymer, 10 to 30 weight percent of dimethylsiloxane units; the polycarbonate-polydiorganosiloxane block copolymer comprises, based on the weight of the polycarbonate-polydiorganosiloxane block copolymer, 70 to 90 weight percent of carbonate units of the formula

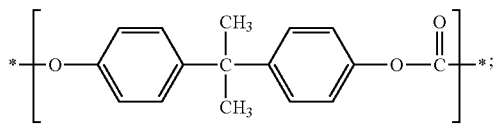

and
the polycarbonate-polydiorganosiloxane block copolymer has a melt volume flow rate of 3 to 20 centimeter$^3$/10 minutes measured at 300° C. and 1.2 kilogram load according to ASTM D1238-04. The carbonate units can be present in a single polycarbonate block, or distributed among multiple polycarbonate blocks. In some embodiments, the carbonate units are distributed among at least two polycarbonate blocks.

In another very specific embodiment, the polycarbonate-polydiorganosiloxane block copolymer has the formula

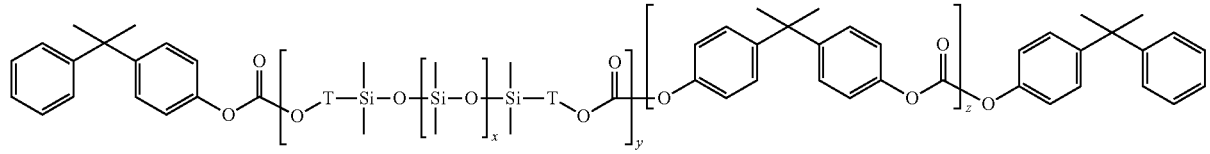

wherein x, y, and z are such that the block copolymer has 10 to 30 weight percent, specifically 15 to 25 weight percent, of polydimethylsiloxane units. In some embodiments, x is, on average, 30 to 60, specifically 30 to 56; y is on average 1 to 5, specifically 1 to 3; and z is on average 70 to 130, specifically 80 to 100. T is a divalent $C_3$-$C_{30}$ linking group, specifically a hydrocarbyl group which can be aliphatic, aromatic, or a combination of aromatic and aliphatic and can contain one or more heteroatoms including oxygen. A wide variety of linking groups and combinations thereof can be used. The T group can be derived from a eugenol or allyl end-capping agent on the polydiorganosiloxane chain. Other end-capping agents, in addition to eugenol, include aliphatically unsaturated monohydric phenols such as 2-allyl phenol and 4-allyl-2-methylphenol. The carbonate units can be present in a single polycarbonate block, or distributed among multiple polycarbonate blocks. In some embodiments, the carbonate units are distributed among at least two polycarbonate blocks.

In another very specific embodiment, the polycarbonate-polydiorganosiloxane block copolymer has the formula

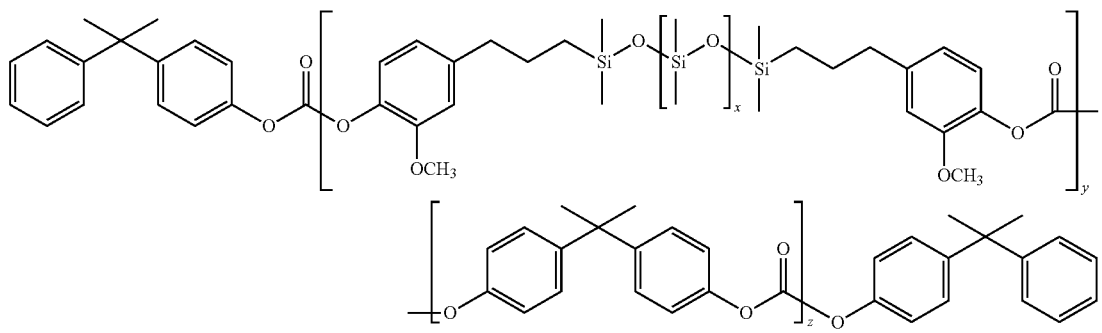

wherein x, y, and z are such that the block copolymer has 10 to 30 weight percent, specifically 15 to 25 weight percent, of polydimethylsiloxane units. In some embodiments, x is, on average, 30 to 60, specifically 30 to 56; y is on average 1 to 5, specifically 1 to 3; and z is on average 70 to 130, specifically 80 to 100. The carbonate units can be present in a single polycarbonate block, or distributed among multiple polycarbonate blocks. In some embodiments, the carbonate units are distributed among at least two polycarbonate blocks.

The composition comprises the polycarbonate-polydiorganosiloxane block copolymer in an amount of 10 to 30 weight percent, based on the total weight of the composition. Within this range, the polycarbonate-polydiorganosiloxane block copolymer amount can be 15 to 25 weight percent.

In addition to the copolyestercarbonate and the polycarbonate-polydiorganosiloxane block copolymer, the composition comprises poly(butylene terephthalate) (CAS Reg. No. 24968-12-5 or 30965-26-5). Poly(butylene terephthalate) is known, as are methods for its preparation. It is also widely commercially available, as, for example, various VALOX™ resins from Sabic Innovative Plastics, CRASTIN™ resins from DuPont, and ULTRADUR™ resins from BASF.

In some embodiments, the poly(butylene terephthalate) has a weight average molecular weight of 40,000 to 200,000 atomic mass units, specifically 50,000 to 150,000 atomic mass units, more specifically 60,000 to 120,000 atomic mass units.

In some embodiments, the poly(butylene terephthalate) has a melt volume flow rate of 10 to 400 cubic centimeters per 10 minutes, measured at 260° C. and 2.16 kilogram load according to ASTM D1238-04. Within this range the melt volume flow rate can be 15 to 300 cubic centimeters per 10 minutes, specifically 15 to 200 cubic centimeters per 10 minutes.

The composition comprises the poly(butylene terephthalate) in an amount of 10 to 30 weight percent, based on the total weight of the composition. Within this range, the poly(butylene terephthalate) amount can be 15-25 weight percent.

In addition to the copolyestercarbonate, the polycarbonate-polydiorganosiloxane block copolymer, and the poly(butylene terephthalate), the composition comprises a reinforcing filler. Reinforcing fillers generally have an aspect ratio of at least 5:1, specifically at least 10:1, and include, for example, glass fibers, carbon fibers, wollastonite, halloysite, clays, talcs, micas, glass flakes, and combinations of at least two of the foregoing. In some embodiments, the reinforcing filler comprises or consists of glass fibers.

Suitable glass fibers include those based on E, A, C, ECR, R, S, D, and NE glasses, as well as quartz. In some embodiments, the glass fibers are cylindrical, in others flat. The glass fibers can, for example, have a diameter of 2 to 30 micrometers, specifically 5 to 25 micrometers, more specifically 6 to 15 micrometers. In some embodiments, the length of the glass fibers before compounding is 1 to 10 millimeters, specifically 1 to 5 millimeters. Suitable glass fiber is commercially available from suppliers including, for example, Owens Corning, Nippon Electric Glass, PPG, and Johns Manville.

The reinforcing filler can, optionally, include an adhesion promoter to improve its compatibility with the polyestercarbonate, the polycarbonate blocks of the polycarbonate-polydiorganosiloxane block copolymer, and the poly(butylene terephthalate). Adhesion promoters include chromium complexes, silanes, titanates, zircoaluminates, propylene maleic anhydride copolymers, reactive cellulose esters, and combinations of at least two of the foregoing.

The composition comprises the reinforcing filler in an amount of 5 to 20 weight percent, based on the total weight of the composition. Within this range, the reinforcing filler amount can be 5 to 15 weight percent.

The composition can, optionally, further comprise one or more additives known in the thermoplastics art. For example, the composition can, optionally, further comprise an additive chosen from stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations of at least two of the foregoing. When present, such additives are typically used in a total amount of less than or equal to 5 weight percent, specifically less than or equal to 2 weight percent, more specifically less than or equal to 1 weight percent, based on the total weight of the composition.

In some embodiments the composition comprises less than 1 weight percent of particulate filler (i.e., fillers having an aspect ratio less than 5:1). Addition of substantial amounts of particulate filler can detract from the ductility of the composition.

In some embodiments, the composition comprises less than 1 weight percent of impact modifier other than the polydiorganosiloxane blocks of the polycarbonate-polydiorganosiloxane block copolymer. It is an advantage of the present composition that the polycarbonate-polydiorganosiloxane block copolymer provides sufficient impact modification, and additional impact modifiers are not required.

In some embodiments, the composition comprises less than 1 weight percent of any polycarbonate other that contributed by the polyestercarbonate and the polycarbonate-polydiorganosiloxane block copolymer. Addition of substantial amounts of polycarbonate reduces the melt flow of the composition.

In some embodiments, the composition comprises less than 5 weight percent, based on the total weight of the composition, of any component other than the polyestercarbonate, the polycarbonate-polydiorganosiloxane block copolymer, the poly(butylene terephthalate), and the reinforcing filler. Within this limit, the amount of any such component can be less than or equal to 2 weight percent, specifically less than or equal to 1 weight percent.

In some embodiments, the composition comprises less than 5 weight percent total, based on the total weight of the composition, of all components other than the polyestercarbonate, the polycarbonate-polydiorganosiloxane block copolymer, the poly(butylene terephthalate), and the reinforcing filler. Within this limit, the amount of all such components can be less than or equal to 2 weight percent, specifically less than or equal to 1 weight percent.

In a very specific embodiment of the composition, T is —(CH$_2$)$_8$—, and R$^1$ and R$^2$ are

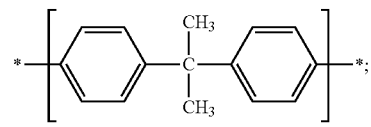

the composition comprises 40 to 60 weight percent of the copolyestercarbonate; the polycarbonate-polydiorganosiloxane block copolymer comprises, based on the weight of the polycarbonate-polydiorganosiloxane block copolymer, 10 to 30 weight percent of dimethylsiloxane units; the polycarbonate-polydiorganosiloxane block copolymer comprises, based on the weight of the polycarbonate-polydiorganosiloxane block copolymer, 70 to 90 weight percent of carbonate units of the formula

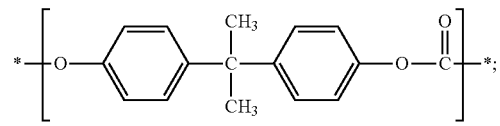

wherein the polycarbonate-polydiorganosiloxane block copolymer has a melt volume flow rate of 3 to 20 centimeter$^3$/10 minutes measured at 300° C. and 1.2 kilogram load according to ASTM D1238-04; the composition comprises 15 to 25 weight percent of the polycarbonate-polydiorganosiloxane block copolymer; the composition comprises 15 to 25 weight percent of the poly(butylene terephthalate); the reinforcing filler comprises glass fibers; and the composition comprises 5 to 15 weight percent of the reinforcing filler.

The composition is useful for fabricating articles. Thus, one embodiment is an article comprising a composition comprising: 35 to 75 weight percent of a copolyestercarbonate comprising the residue of a C$_6$-C$_{20}$ alpha,omega-aliphatic dicarboxylic acid, a dihydroxyaromatic compound, and a carbonate precursor; 10 to 30 weight percent of a polycarbonate-polydiorganosiloxane block copolymer; 10 to 30 weight percent of poly(butylene terephthalate); and 5 to 20 weight percent reinforcing filler; wherein all weight percents are based on the total weight of the composition.

The composition is particularly useful for forming plastic components of consumer electronic devices. Such components include, for example, mobile phone front covers and mobile phone battery covers. The advantages of the composition are especially evident when the article prepared from the composition is thin in one dimension. For example, the article can have a thickness of less than or equal to 2 millimeters, specifically less than or equal to 1 millimeter. In some embodiments, the article is thin in one dimension and substantially larger in the other two (orthogonal) dimensions. For example, the article can comprises a first dimension of at least 4 centimeters, a second dimension of at least 2 centimeters, and a third dimension of less than or equal to 2 millimeters, specifically less than or equal to 1 millimeter.

Suitable methods of forming such articles include single layer and multilayer sheet extrusion, injection molding, blow molding, film extrusion, profile extrusion, pultrusion, compression molding, thermoforming, pressure forming, hydroforming, and vacuum forming. Combinations of the foregoing article fabrication methods can be used. In some embodiments, the article is formed by injection molding.

In some embodiments of the article, the composition used to form the article has the following characteristics: T is —(CH$_2$)$_8$— and R$^1$ and R$^2$ are

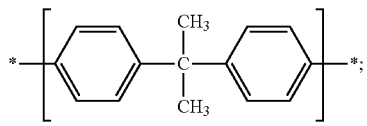

the composition comprises 40 to 60 weight percent of the copolyestercarbonate; the polycarbonate-polydiorganosiloxane block copolymer comprises, based on the weight of the polycarbonate-polydiorganosiloxane block copolymer, 10 to 30 weight percent of dimethylsiloxane units; the polycarbonate-polydiorganosiloxane block copolymer comprises, based on the weight of the polycarbonate-polydiorganosiloxane block copolymer, 70 to 90 weight percent of carbonate units of the formula

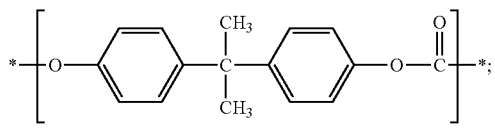

wherein the polycarbonate-polydiorganosiloxane block copolymer has a melt volume flow rate of 3 to 20 centimeter$^3$/10 minutes measured at 300° C. and 1.2 kilogram load according to ASTM D1238-04; the composition comprises 15 to 25 weight percent of the polycarbonate-polydiorganosiloxane block copolymer; the composition comprises 15 to 25 weight percent of the poly(butylene terephthalate); the reinforcing filler comprises glass fibers; and the composition comprises 5 to 15 weight percent of the reinforcing filler.

The invention includes at least the following embodiments.

Embodiment 1

A composition, comprising:

45 to 85 weight percent of a polycarbonate comprising 35 to 75 weight percent of a copolyestercarbonate comprising ester units of the formula

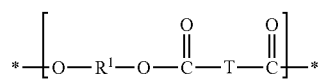

wherein, independently in each ester unit, R$^1$ is an unsubstituted or substituted divalent C$_6$-C$_{30}$ aromatic group; and T is an unsubstituted or substituted C$_4$-C$_{18}$ aliphatic divalent group; and carbonate units of the formula

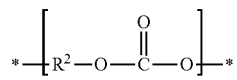

wherein, independently in each carbonate unit, R$^2$ is a radical of the formula

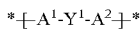

wherein each of A$^1$ and A$^2$ is independently a monocyclic divalent aryl radical and Y$^1$ is a bridging radical having one or two atoms that separate A$^1$ from A$^2$; and 10 to 30 weight percent of a polycarbonate-polydiorganosiloxane block copolymer;

10 to 30 weight percent of poly(butylene terephthalate); and 5 to 20 weight percent reinforcing filler;

wherein all weight percents are based on the total weight of the composition.

Embodiment 2

The composition of embodiment 1, exhibiting a melt volume flow rate of at least 15 centimeter$^3$/10 minutes measured at 300° C. and 1.2 kilogram load according to ASTM D1238; a notched Izod impact strength of at least 200 joules/meter measured at 23° C. according to ASTM D256; a tensile stress at yield of at least 50 megapascals measured at 23° C. according to ASTM D638; and a Vicat softening temperature of at least 115° C. measured at a load of 50 Newtons and a heating rate of 120° C./hour according to ASTM D1525.

Embodiment 3

The composition of embodiment 1 or 2, wherein T is —(CH$_2$)$_8$—.

Embodiment 4

The composition of any of embodiments 1-3, wherein R$^1$ and R$^2$ are

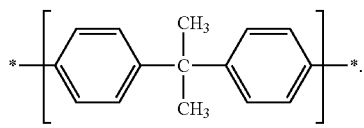

Embodiment 5

The composition of embodiment 1 or 2, wherein T is —(CH$_2$)$_8$—, and R$^1$ and R$^2$ are

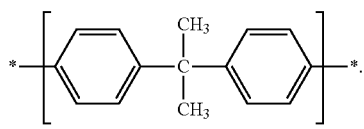

Embodiment 6

The composition of any of embodiments 1-5, wherein the copolyestercarbonate comprises 1 to 13 mole percent of the ester units, and 87 to 99 mole percent of the carbonate units.

Embodiment 7

The composition of any of embodiments 1-6, wherein the polycarbonate-polydiorganosiloxane block copolymer comprises 3 to 30 weight percent of diorganosiloxane units.

Embodiment 8

The composition of any of embodiments 1-7, wherein the polycarbonate-polydiorganosiloxane block copolymer comprises a polydiorganosiloxane block comprising diorganosiloxane units of the formula

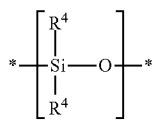

wherein each occurrence of R$^4$ is independently C$_1$-C$_{13}$ hydrocarbyl.

Embodiment 9

The composition of any of embodiments 1-8, wherein the polycarbonate-polydiorganosiloxane block copolymer comprises, based on the weight of the polycarbonate-polydiorganosiloxane block copolymer, 10 to 30 weight percent of dimethylsiloxane units; wherein the polycarbonate-polydiorganosiloxane block copolymer comprises, based on the weight of the polycarbonate-polydiorganosiloxane block copolymer, 70 to 90 weight percent of carbonate units of the formula

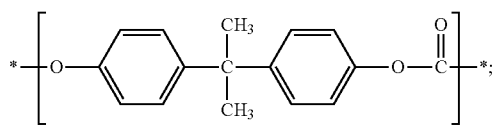

and wherein the polycarbonate-polydiorganosiloxane block copolymer has a melt volume flow rate of 3 to 20 centimeter$^3$/10 minutes measured at 300° C. and 1.2 kilogram load according to ASTM D1238-04.

Embodiment 10

The composition of any of embodiments 1-9, wherein the reinforcing filler comprises glass fibers.

Embodiment 11

The composition of any of embodiments 1-10, wherein the polycarbonate comprises 0 to 5 weight percent total of all polycarbonates other than the copolyestercarbonate and the polycarbonate-polydiorganosiloxane block copolymer.

Embodiment 12

The composition of any of embodiments 1-11, wherein the polycarbonate consists of the copolyestercarbonate and the polycarbonate-polydiorganosiloxane block copolymer.

Embodiment 13

The composition of any of embodiments 1-12, comprising 0 to 1 weight percent of particulate filler.

Embodiment 14

The composition of any of embodiments 1-3, comprising 0 to 1 weight percent of impact modifier other than the polydiorganosiloxane blocks of the polycarbonate-polydiorganosiloxane block copolymer.

Embodiment 15

The composition of any of embodiments 1-6, comprising 0 to 5 weight percent of any component other than the polyestercarbonate, the polycarbonate-polydiorganosiloxane block copolymer, the poly(butylene terephthalate), and the reinforcing filler.

Embodiment 16

The composition of embodiment 1, wherein T is —(CH$_2$)$_8$—, and R$^1$ and R$^2$ are

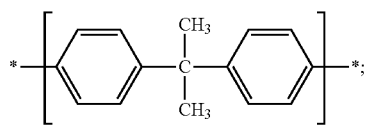

wherein the composition comprises 40 to 60 weight percent of the copolyestercarbonate; wherein the polycarbonate-polydiorganosiloxane block copolymer comprises, based on the weight of the polycarbonate-polydiorganosiloxane block copolymer, 10 to 30 weight percent of dimethylsiloxane units; wherein the polycarbonate-polydiorganosiloxane block copolymer comprises, based on the weight of the polycarbonate-polydiorganosiloxane block copolymer, 70 to 90 weight percent of carbonate units of the formula

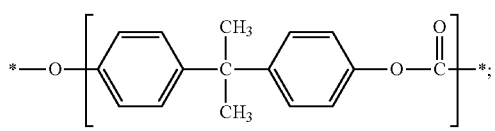

wherein the polycarbonate-polydiorganosiloxane block copolymer has a melt volume flow rate of 3 to 20 centimeter$^3$/10 minutes measured at 300° C. and 1.2 kilogram load according to ASTM D1238-04; wherein the composition comprises 15 to 25 weight percent of the polycarbonate-polydiorganosiloxane block copolymer; wherein the composition comprises 15 to 25 weight percent of the poly(butylene terephthalate); wherein the reinforcing filler comprises glass fibers; and wherein the composition comprises 5 to 15 weight percent of the reinforcing filler Embodiment 17

An article comprising a composition comprising:

45 to 85 weight percent of a polycarbonate comprising 35 to 75 weight percent of a copolyestercarbonate comprising ester units of the formula

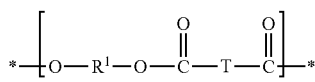

wherein, independently in each ester unit, $R^1$ is an unsubstituted or substituted divalent $C_6$-$C_{30}$ aromatic group; and T is an unsubstituted or substituted $C_4$-$C_{18}$ aliphatic divalent group; and carbonate units of the formula

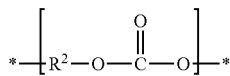

wherein, independently in each carbonate unit, $R^2$ is a radical of the formula

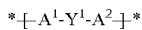

wherein each of $A^1$ and $A^2$ is independently a monocyclic divalent aryl radical and $Y^1$ is a bridging radical having one or two atoms that separate $A^1$ from $A^2$; and 10 to 30 weight percent of a polycarbonate-polydiorganosiloxane block copolymer;

10 to 30 weight percent of poly(butylene terephthalate); and 5 to 20 weight percent reinforcing filler;

wherein all weight percents are based on the total weight of the composition.

Embodiment 18

The article of embodiment 17, wherein the article comprises a thickness less than or equal to 2 millimeters.

Embodiment 19

The article of embodiment 17 or 18, wherein the article is or is part of a mobile phone front cover or a mobile phone battery cover.

Embodiment 20

The article of any of embodiments 17-19, The article of any of embodiments 15-17, wherein T is —(CH$_2$)$_8$—, and $R^1$ and $R^2$ are

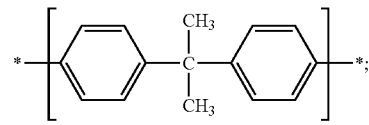

wherein the composition comprises 40 to 60 weight percent of the copolyestercarbonate; wherein the polycarbonate-polydiorganosiloxane block copolymer comprises, based on the weight of the polycarbonate-polydiorganosiloxane block copolymer, 10 to 30 weight percent of dimethylsiloxane units; wherein the polycarbonate-polydiorganosiloxane block copolymer comprises, based on the weight of the polycarbonate-polydiorganosiloxane block copolymer, 70 to 90 weight percent of carbonate units of the formula

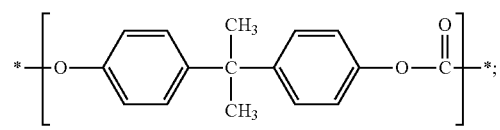

wherein the polycarbonate-polydiorganosiloxane block copolymer has a melt volume flow rate of 3 to 20 centimeter$^3$/10 minutes measured at 300° C. and 1.2 kilogram load according to ASTM D1238-04; wherein the composition comprises 15 to 25 weight percent of the polycarbonate-polydiorganosiloxane block copolymer; wherein the composition comprises 15 to 25 weight percent of the poly(butylene terephthalate); wherein the reinforcing filler comprises glass fibers; and wherein the composition comprises 5 to 15 weight percent of the reinforcing filler.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1-2, Comparative Examples 1-6

Components used to prepare the compositions are summarized in Table 1.

TABLE 1

| Component | Description |
|---|---|
| PC Resin ($M_w$ 30 kDa) | Bisphenol A polycarbonate resin (CAS Reg. No. 25971-63-5) having a weight average molecular weight of about 30,000 atomic mass units. |
| PC Resin ($M_w$ 21 kDa) | Bisphenol A polycarbonate resin (CAS Reg. No. 25971-63-5) having a weight average molecular weight of about 21,000 atomic mass units. |
| HFD Resin ($M_w$ 37 kDa) | Polyestercarbonate synthesized from sebacic acid, bisphenol A, and phosgene (CAS Reg. No. 136541-41-8), having a sebacic acid content of about 8.25 mole percent and a weight average molecular weight of about 37,000 atomic mass units. |
| HFD Resin ($M_w$ 21.5 kDa) | Polyestercarbonate synthesized from sebacic acid, bisphenol A, and phosgene (CAS Reg. No. 136541-41-8), having a sebacic acid content of about 6 mole percent and a weight average molecular weight of about 21,500 atomic mass units. |
| PC-siloxane copolymer | Poly(bisphenol A carbonate)-polydimethylsiloxane block copolymer (CAS Reg. No. 202483-49-6), having a polydimethylsiloxane content of about 20 weight percent and a melt volume flow rate of about 6 centimeter$^3$/10 minutes measured at 300° C. and 1.2 kilogram load according to ASTM D1238-04, and being opaque in bulk form; preparable by the synthetic procedure of European Patent Application Publication No. 0 524 731 A1 of Hoover, page 5, Preparation 2. |
| MBS | Methyl methacrylate-butadiene-styrene copolymer (CAS Reg. No. 25053-09-2) having a pobutadiene content of 78 weight percent; obtained as PARALOID ™ EXL-2650A from The Dow Chemical Company. |
| Glass fiber | Surface-treated glass fiber having a diameter of about 14 micrometers and a pre-compounding length of about 4 millimeters; obtained as CRATEC ™ 415A-14C Chopped Strands from Owens Corning. |
| PBT | Poly(butylene terephthalate) (CAS Reg. No. 24968-12-5 or 30965-26-5) having an intrinsic viscosity of about 13 deciliters per gram; obtained as CCP 1100-211 X from Chang Chun Plastics Co., Ltd. |
| Quencher | Zinc dihydrogen phosphate (CAS Reg. No. 13598-37-3); obtained as Z 21-82 from Budenheim Iberica. |
| Thermal stabilizer | Pentaerythritol tetrakis(3-(3,5-di-tert-butyl-4-hydroxyphenyl)propionate) (CAS Reg. No. 6683-19-8); obtained as IRGANOX ™ 1010 from BASF. |
| Mold release agent | Pentaerythritol tetrastearate (CAS Reg. No. 115-83-3); obtained as PETS from FACI Asia Pacific PTE Ltd. |

Compositions were prepared as follows. All components except glass fiber were dry blended, then added to the feed throat of a 37 millimeter Toshiba twin-screw extruder operating at 340 rotations per minute. Glass fibers were added downstream. The extruder temperature profile from feed throat to die was 100° C./200° C./250° C./260° C./260° C./265° C./265° C./265° C./270° C./270° C./270° C./270° C. The extruded was pelletized and dried for four hours at 80° C. before molding. Test articles were molded on a FANUC S2000i injection molding machine operating with a barrel temperature of 255-265° C. and a mold temperature of 55° C.

The following procedures were used for property testing. Melt volume rate (MVR) values (expressed in units of cubic centimeters per 10 minutes) were determined according to ASTM D 1238-04 using Procedure B; 300° C. and 1.2 kilogram load, or 265° C. and 2.16 kilogram load. Values of tensile modulus and tensile stress at yield (each expressed in megapascals), and tensile elongation (expressed in percent), were determined at 23° C. according to ASTM D 638-10 using a Type I bar, a gage length of 50 millimeters, and a test speed of 50 millimeters/minute. Notched Izod impact strength values (expressed in units of joules/meter), were determined according to ASTM D 256-10 using bar cross-sectional dimensions 3.2 millimeters by 12.7 millimeters; a temperature of 23 or 0° C.; and a hammer torque of 5 pound-force/foot (73 newtons/meter). In Table 2, "Ductility, 23° C. (%)" and "Ductility, 0° C. (%)" refer to percent of samples exhibiting ductile failure (rather than brittle failure). Vicat softening temperature (VST) values (expressed in ° C.), were determined according to ASTM D 1525-09 using a load of 50 Newtons and a heating rate 120° C./hour. Heat deflection temperature (HDT) values (expressed in ° C.), were determined according to ASTM D 648-07 using bar cross-sectional dimensions of 3.2 millimeters by 12.7 millimeters, and a loading fiber stress of 0.45 or 1.82 megapascals.

Compositions and results are summarized in Table 2. Inventive Samples #3 and #4 incorporate a polycarbonate-polydiorganosiloxane block copolymer and copolyestercarbonates of a $C_6$-$C_{20}$ alpha,omega-aliphatic dicarboxylic acid, a dihydroxyaromatic compound, and a carbonate precursor. The results in Table 2 show that Samples #3 and #4 provided an improved balance of melt flow and impact strength compared to Samples #1 and #2 using bisphenol A polycarbonate instead of the copolyestercarbonate. Samples #3 and #4 also maintain tensile modulus and heat deflection temperature relative to Samples #1 and #2. Compared to Samples #5 and #6 using other impact modifiers such as MBS and bisphenol A polycarbonate, Samples #3 and #4 have better impact strength and higher melt flow at both 265 and 300° C., while tensile modulus and deflection temperature are substantially retained.

Considering results for other filled system without impact modifiers, Sample #7, incorporating a high-flow (low molecular weight) bisphenol A polycarbonate, has lower melt flow and impact strength (brittle at room temperature) compared to Sample #4. The same is true when Sample #8, with high molecular weight bisphenol A polycarbonate, is compared to Sample #3.

The improved balance of melt flow and impact strength exhibited by inventive Samples #3 and #4 is graphically illustrated by the FIGURE, which is a plot of notched Izod impact strength, expressed in units of joules/meter and determined at 23° C. according to ASTM D256, versus melt volume flow rate at 300° C., expressed in cubic centimeters/10 minutes and determined at 300° C. and 1.2 kilogram load according to ASTM D1238. The points on the plot define three lines, "PC/PBT/GF" for samples with bisphenol A polycarbonate, poly(butylene terephthalate), and glass fibers (#7 and #8); "PC/PBT/IM/GF" for samples with bisphenol A polycarbonate, poly(butylene terephthalate), an impact modifier, and glass fibers (#1, #2, #5, and #6); and "HFD/PBT/IM/GF" for samples with copolyestercarbonate, poly(butylene terephthalate), polycarbonate-polydiorganosiloxane block copolymer as an impact modifier, and glass fibers (#3 and #4). The FIGURE clearly shows that Samples #3 and #4 exhibit an improved balance of melt flow and impact strength compared to the other samples.

To summarize, the results indicate that, compared to corresponding compositions containing bisphenol A polycarbonate in place of polyestercarbonate, glass fiber-reinforced compositions with poly(butylene terephthalate), polycarbonate-polydiorganosiloxane block copolymer, and the copolyestercarbonate exhibit an improved balance of melt flow and ductility while substantially retaining heat resistance and tensile properties.

TABLE 2

|  | #1 | #2 | #3 | #4 | #5 |
|---|---|---|---|---|---|
| COMPOSITIONS | | | | | |
| PC Resin (Mw 30 kDa) | 49.55 | 0 | 0 | 0 | 62.55 |
| PC Resin (Mw 21 kDa) | 0 | 49.55 | 0 | 0 | 0 |
| HFD Resin (Mw 37 kDa) | 0 | 0 | 49.55 | 0 | 0 |
| HFD Resin (Mw 21.5 kDa) | 0 | 0 | 0 | 49.55 | 0 |
| PC-siloxane copolymer | 20 | 20 | 20 | 20 | 0 |
| MBS | 0 | 0 | 0 | 0 | 7 |
| Glass fiber | 10 | 10 | 10 | 10 | 10 |
| PBT polyester | 20 | 20 | 20 | 20 | 20 |
| Quencher | 0.1 | 0.1 | 0.1 | 0.1 | 0.1 |
| Thermal stabilizer | 0.15 | 0.15 | 0.15 | 0.15 | 0.15 |
| Mold release agent | 0.2 | 0.2 | 0.2 | 0.2 | 0.2 |
| PROPERTIES | | | | | |
| MVR, 265° C. (cm³/10 min) | 5.3 | 9.8 | 6.7 | 11.2 | 4.9 |
| MVR, 300° C. (cm³/10 min) | 11.4 | 21.8 | 17.1 | 26.4 | 10.9 |
| Tensile Modulus (MPa) | 4081 | 4036 | 3726 | 3929 | 3879 |
| Tensile Stress (MPa) | 58.1 | 56.8 | 52.3 | 54.7 | 55.6 |
| Tensile Elongation (%) | 7.8 | 6.9 | 11.7 | 7.8 | 7.2 |
| Vicat softening temp. (° C.) | 123 | 121 | 119 | 119 | 119 |
| HDT, 0.45 MPa (° C.) | 119 | 119 | 114 | 114 | 115 |
| HDT, 1.82 MPa (° C.) | 107 | 106 | 103 | 105 | 104 |
| Notched Izod Impact Strength, 23° C. (J/m) | 257 | 210 | 303 | 220 | 260 |
| Ductility, 23° C. (%) | 100 | 100 | 100 | 100 | 100 |
| Notched Izod Impact Strength, 0° C. (J/m) | 192 | 170 | 220 | 170 | 200 |
| Ductility, 0° C. (%) | 80 | 80 | 100 | 100 | 100 |

|  | #6 | #7 | #8 |
|---|---|---|---|
| COMPOSITIONS | | | |
| PC Resin (Mw 30 kDa) | 0 | 0 | 69.55 |
| PC Resin (Mw 21 kDa) | 62.55 | 69.55 | 0 |
| HFD Resin (Mw 37 kDa) | 0 | 0 | 0 |
| HFD Resin (Mw 21.5 kDa) | 0 | 0 | 0 |
| PC-siloxane copolymer | 0 | 0 | 0 |
| MBS | 7 | 0 | 0 |
| Glass fiber | 10 | 10 | 10 |
| PBT polyester | 20 | 20 | 20 |
| Quencher | 0.1 | 0.1 | 0.1 |
| Thermal stabilizer | 0.15 | 0.15 | 0.15 |
| Mold release agent | 0.2 | 0.2 | 0.2 |
| PROPERTIES | | | |
| MVR, 265° C. (cm³/10 min) | 8.1 | 8.6 | 4.0 |
| MVR, 300° C. (cm³/10 min) | 18.9 | 18.3 | 8.1 |
| Tensile Modulus (MPa) | 3918 | 3923 | 4047 |
| Tensile Stress (MPa) | 56.5 | 84 | 85 |
| Tensile Elongation (%) | 6.8 | 4 | 4 |
| Vicat softening temp. (° C.) | 117 | 130 | 132 |
| HDT, 0.45 MPa (° C.) | 112 | 122 | 125 |
| HDT, 1.82 MPa (° C.) | 100 | 104 | 101 |
| Notched Izod Impact Strength, 23° C. (J/m) | 210 | 70 | 98 |
| Ductility, 23° C. (%) | 100 | 0 | 0 |
| Notched Izod Impact Strength, 0° C. (J/m) | 160 | 52 | 78 |
| Ductility, 0° C. (%) | 80 | 0 | 0 |

The invention claimed is:

1. A composition, comprising:
   45 to 85 weight percent of a polycarbonate comprising
      35 to 75 weight percent of a copolyestercarbonate comprising
         ester units of the formula

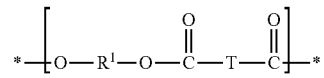

wherein, independently in each ester unit, $R^1$ is an unsubstituted or substituted divalent $C_6$-$C_{30}$ aromatic group; and T is an unsubstituted or substituted $C_4$-$C_{18}$ aliphatic divalent group; and
   carbonate units of the formula

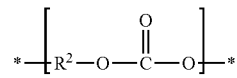

wherein, independently in each carbonate unit, $R^2$ is a radical of the formula

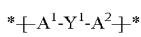

wherein each of $A^1$ and $A^2$ is independently a monocyclic divalent aryl radical and $Y^1$ is a bridging radical having one or two atoms that separate $A^1$ from $A^2$; and
   10 to 30 weight percent of a polycarbonate-polydiorganosiloxane block copolymer;
   10 to 30 weight percent of poly(butylene terephthalate); and
   5 to 20 weight percent reinforcing filler;
   wherein all weight percents are based on the total weight of the composition.

2. The composition of claim 1, exhibiting a melt volume flow rate of at least 15 centimeter³/10 minutes measured at 300° C. and 1.2 kilogram load according to ASTM D1238; a notched Izod impact strength of at least 200 joules/meter measured at 23° C. according to ASTM D256; a tensile stress at yield of at least 50 megapascals measured at 23° C. according to ASTM D638; and a Vicat softening temperature of at least 115° C. measured at a load of 50 Newtons and a heating rate of 120° C./hour according to ASTM D1525.

3. The composition of claim 1, wherein T is —(CH$_2$)$_8$—.
4. The composition of claim 1, wherein R$^1$ and R$^2$ are

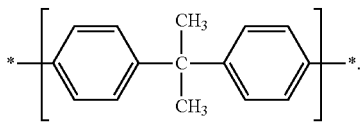

5. The composition of claim 1, wherein T is —(CH$_2$)$_8$—, and R$^1$ and R$^2$ are

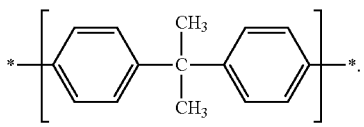

6. The composition of claim 1, wherein the copolyestercarbonate comprises 1 to 13 mole percent of the ester units, and 87 to 99 mole percent of the carbonate units.

7. The composition of claim 1, wherein the polycarbonate-polydiorganosiloxane block copolymer comprises 3 to 30 weight percent of diorganosiloxane units.

8. The composition of claim 1, wherein the polycarbonate-polydiorganosiloxane block copolymer comprises a polydiorganosiloxane block comprising diorganosiloxane units of the formula wherein each occurrence of R$^4$ is independently C$_1$-C$_{13}$ hydrocarbyl.

9. The composition of claim 1,
wherein the polycarbonate-polydiorganosiloxane block copolymer comprises, based on the weight of the polycarbonate-polydiorganosiloxane block copolymer, 10 to 30 weight percent of dimethylsiloxane units;
wherein the polycarbonate-polydiorganosiloxane block copolymer comprises, based on the weight of the polycarbonate-polydiorganosiloxane block copolymer, 70 to 90 weight percent of carbonate units of the formula

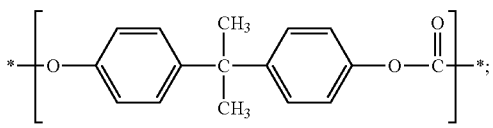

and
wherein the polycarbonate-polydiorganosiloxane block copolymer has a melt volume flow rate of 3 to 20 centimeter$^3$/10 minutes measured at 300° C. and 1.2 kilogram load according to ASTM D1238-04.

10. The composition of claim 1, wherein the reinforcing filler comprises glass fibers.

11. The composition of claim 1, wherein the polycarbonate comprises 0 to 5 weight percent total of all polycarbonates other than the copolyestercarbonate and the polycarbonate-polydiorganosiloxane block copolymer.

12. The composition of claim 1, wherein the polycarbonate consists of the copolyestercarbonate and the polycarbonate-polydiorganosiloxane block copolymer.

13. The composition of claim 1, comprising 0 to 1 weight percent of particulate filler.

14. The composition of claim 1, comprising 0 to 1 weight percent of impact modifier other than the polydiorganosiloxane blocks of the polycarbonate-polydiorganosiloxane block copolymer.

15. The composition of claim 1, comprising 0 to 5 weight percent of any component other than the polyestercarbonate, the polycarbonate-polydiorganosiloxane block copolymer, the poly(butylene terephthalate), and the reinforcing filler.

16. The composition of claim 1,
wherein T is —(CH$_2$)$_8$—, and R$^1$ and R$^2$ are

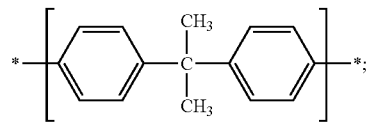

wherein the composition comprises 40 to 60 weight percent of the copolyestercarbonate;
wherein the polycarbonate-polydiorganosiloxane block copolymer comprises, based on the weight of the polycarbonate-polydiorganosiloxane block copolymer, 10 to 30 weight percent of dimethylsiloxane units;
wherein the polycarbonate-polydiorganosiloxane block copolymer comprises, based on the weight of the polycarbonate-polydiorganosiloxane block copolymer, 70 to 90 weight percent of carbonate units of the formula

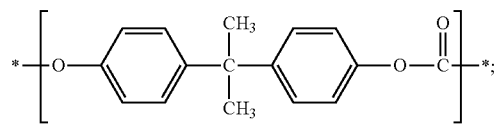

wherein the polycarbonate-polydiorganosiloxane block copolymer has a melt volume flow rate of 3 to 20 centimeter$^3$/10 minutes measured at 300° C. and 1.2 kilogram load according to ASTM D1238-04;
wherein the composition comprises 15 to 25 weight percent of the polycarbonate-polydiorganosiloxane block copolymer;
wherein the composition comprises 15 to 25 weight percent of the poly(butylene terephthalate);
wherein the reinforcing filler comprises glass fibers; and
wherein the composition comprises 5 to 15 weight percent of the reinforcing filler.

17. An article comprising a composition comprising:
45 to 85 weight percent of a polycarbonate comprising
35 to 75 weight percent of a copolyestercarbonate comprising
ester units of the formula

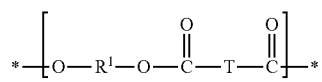

wherein, independently in each ester unit, R$^1$ is an unsubstituted or substituted divalent C$_6$-C$_{30}$ aromatic group; and T is an unsubstituted or substituted C$_4$-C$_{18}$ aliphatic divalent group; and
carbonate units of the formula

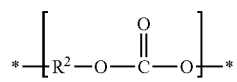

wherein, independently in each carbonate unit, $R^2$ is a radical of the formula

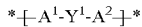

wherein each of $A^1$ and $A^2$ is independently a monocyclic divalent aryl radical and $Y^1$ is a bridging radical having one or two atoms that separate $A^1$ from $A^2$; and 10 to 30 weight percent of a polycarbonate-polydiorganosiloxane block copolymer;

10 to 30 weight percent of poly(butylene terephthalate); and 5 to 20 weight percent reinforcing filler;

wherein all weight percents are based on the total weight of the composition.

18. The article of claim 17, wherein the article comprises a thickness less than or equal to 2 millimeters.

19. The article of claim 17, wherein the article is or is part of a mobile phone front cover or a mobile phone battery cover.

20. The article of claim 17, wherein T is —$(CH_2)_8$—, and $R^1$ and $R^2$ are

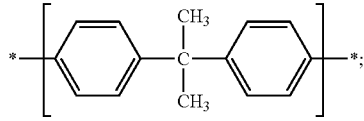

wherein the composition comprises 40 to 60 weight percent of the copolyestercarbonate;

wherein the polycarbonate-polydiorganosiloxane block copolymer comprises, based on the weight of the polycarbonate-polydiorganosiloxane block copolymer, 10 to 30 weight percent of dimethylsiloxane units;

wherein the polycarbonate-polydiorganosiloxane block copolymer comprises, based on the weight of the polycarbonate-polydiorganosiloxane block copolymer, 70 to 90 weight percent of carbonate units of the formula

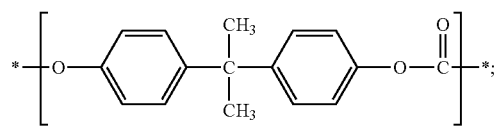

wherein the polycarbonate-polydiorganosiloxane block copolymer has a melt volume flow rate of 3 to 20 centimeter$^3$/10 minutes measured at 300° C. and 1.2 kilogram load according to ASTM D1238-04;

wherein the composition comprises 15 to 25 weight percent of the polycarbonate-polydiorganosiloxane block copolymer;

wherein the composition comprises 15 to 25 weight percent of the poly(butylene terephthalate);

wherein the reinforcing filler comprises glass fibers; and wherein the composition comprises 5 to 15 weight percent of the reinforcing filler.

* * * * *